R. McCLENATHEN.
MACHINE FOR AND PROCESS OF FORMING RUBBER TIRES
APPLICATION FILED JAN. 9, 1919.

1,312,491.

Patented Aug. 5, 1919.

INVENTOR
Robert McClenathen
BY
ATTORNEY

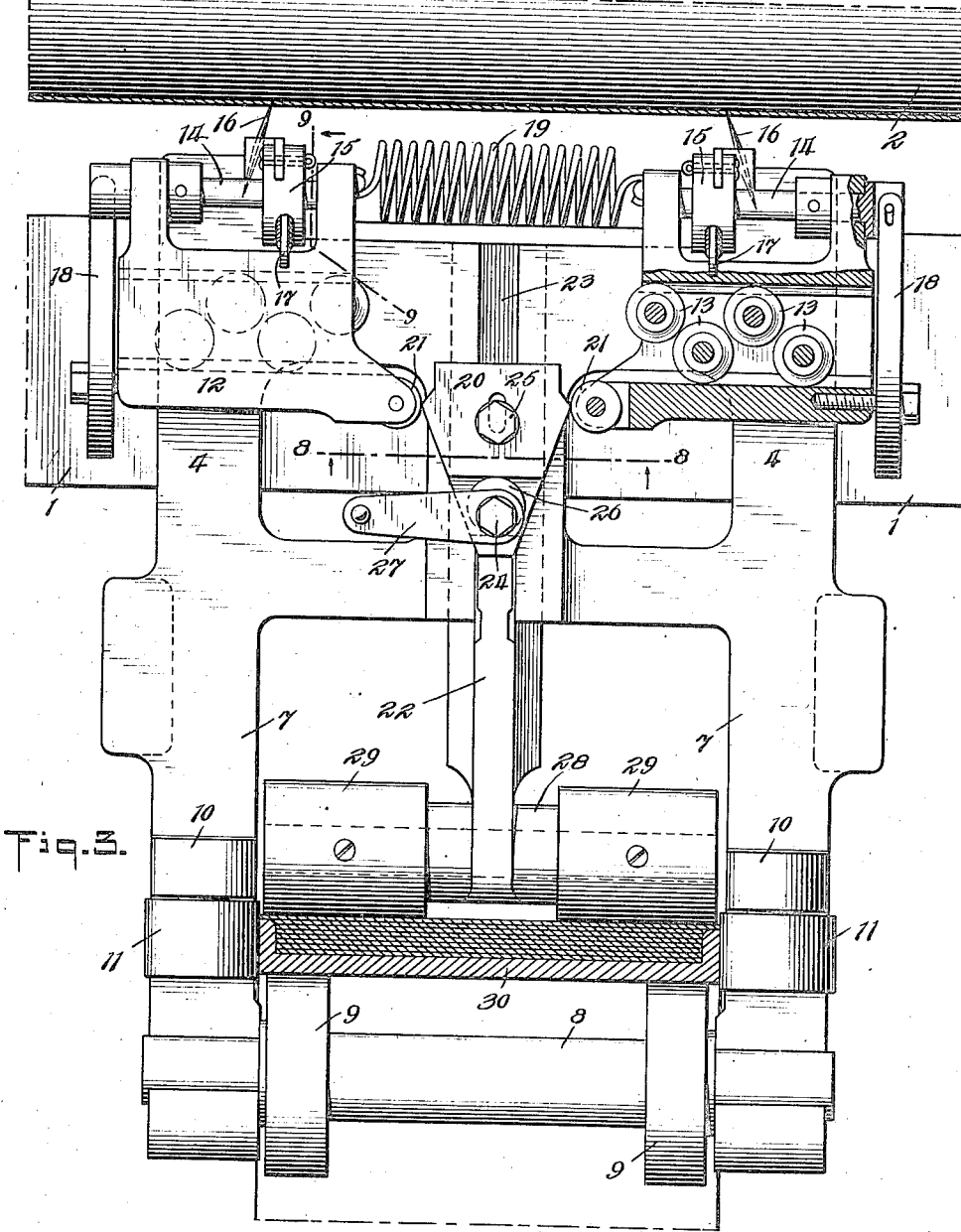

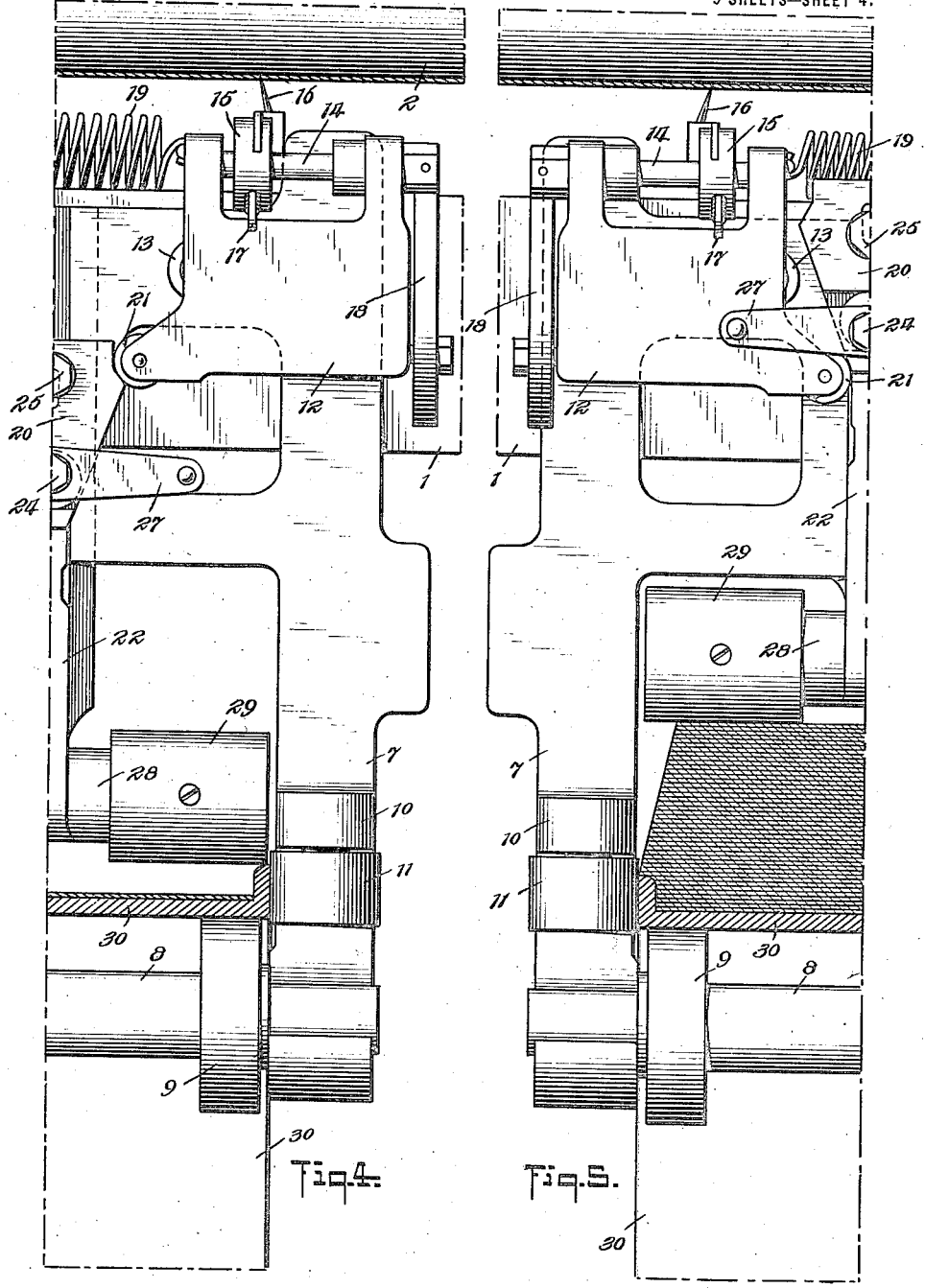

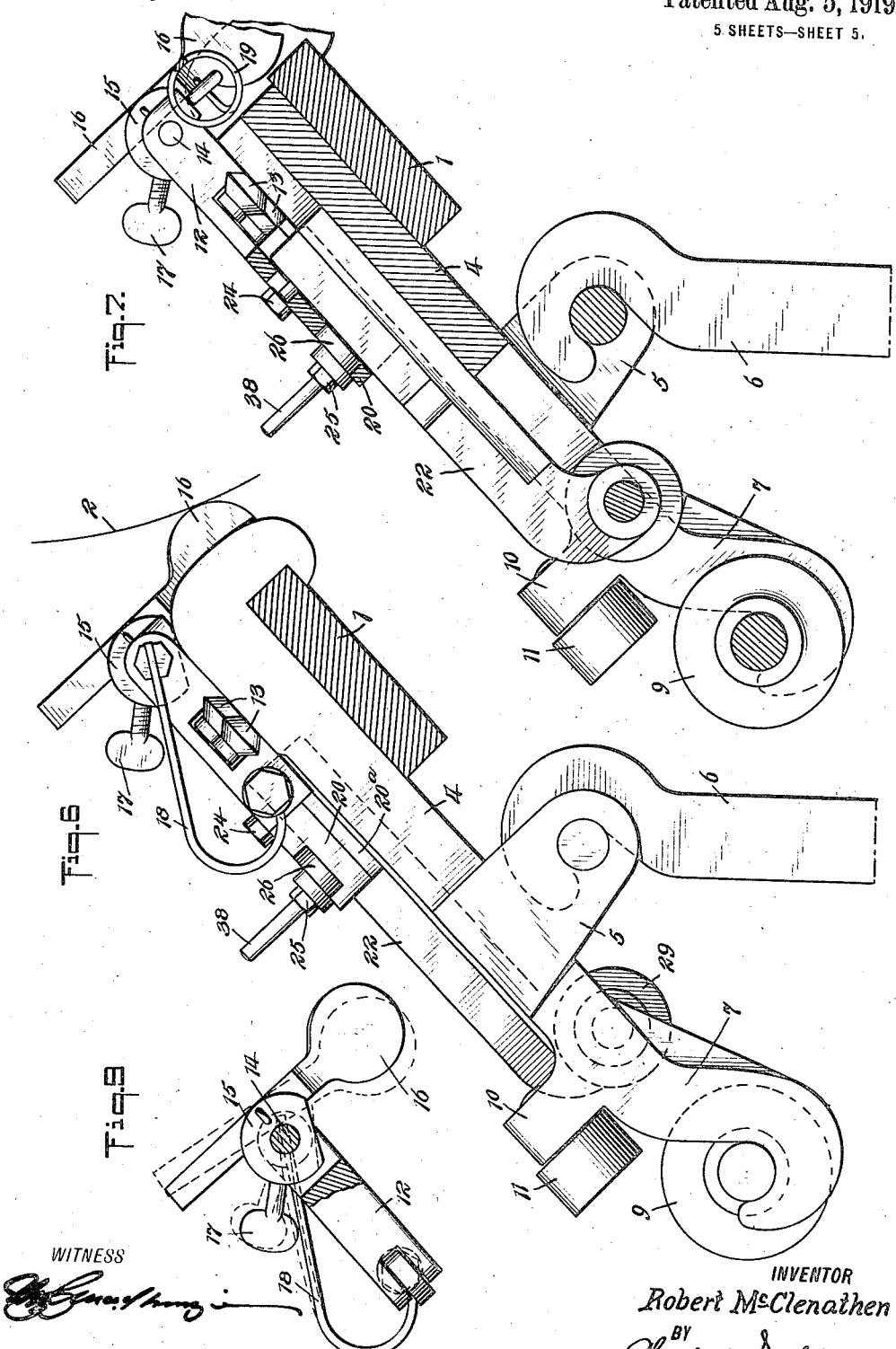

UNITED STATES PATENT OFFICE.

ROBERT McCLENATHEN, OF CUYAHOGA FALLS, OHIO, ASSIGNOR TO KELLY-SPRINGFIELD TIRE CO., OF NEW YORK, N. Y., A CORPORATION.

MACHINE FOR AND PROCESS OF FORMING RUBBER TIRES.

1,312,491.  Specification of Letters Patent.  Patented Aug. 5, 1919.

Application filed January 9, 1919. Serial No. 270,401.

*To all whom it may concern:*

Be it known that I, ROBERT McCLENATHEN, a citizen of the United States, resident of Cuyahoga Falls, Summit county, Ohio, have invented a new and useful Machine for and Process of Forming Rubber Tires.

The invention relates to the forming, or making of what is known as solid rubber tires, and more particularly to the process of building up the un-vulcanized rubber on the metal base rim.

In the manufacture of solid rubber tires, particularly the larger ones used on trucks and similar vehicles, the tire is usually built up on the metal base rim by winding thin strips of un-vulcanized rubber of uniform width thereon as the rim is revolved to receive the same, until the desired thickness is obtained, after which triangular pieces are cut off from each side to give the rubber the desired taper from base to tread or periphery. This trimming as now practised is a separate operation.

The object of my invention is to cut the strip of un-vulcanized rubber to desired and gradually diminishing widths and deposit the same upon the wheel rim automatically and practically simultaneously, while holding and rotating the wheel rim as a part of the operation by power preferably, but not necessarily, transmitted through the rubber sheeting machine known as the calender; thus resulting in a saving of time and labor and lessening the opportunity for dirt and air bubbles to accumulate between the layers of rubber during the building-up process.

The apparatus consists of a frame suspended opposite the calender drum, on which frame is mounted cutting disks or knives, the sharp edges of which are held in loose contact with the exterior surface of the calender drum, which drum carries a thin sheet of un-vulcanized rubber and as the drum revolves the knives cut a strip of rubber from the sheet, which strip of rubber is simultaneously carried to the wheel rim and continuously wound up thereon until the desired height is obtained.

In the annexed drawing, Figure 1 is a side elevation, partially in section, of the common form of rubber calendering machine, with my invention and the wheel rim in position to receive the rubber strip, all shown in proper relation to each other. The rubber strip is seen in the position it occupies in traveling around the calender drum and onto the wheel rim in the direction indicated by the arrows.

Fig. 3 is also a front view of the upper, or cutting part of my device, on a larger scale than Fig. 2, with a section of the tire rim in place showing the rubber built up to the tops of the flanges and up to where the narrowing process begins. The cutting knives are shown in contact with a section of the calender drum.

Fig. 4 is a front view of the right-hand half of the upper, or cutting portion of my invention with half of a section of the wheel rim positioned as at the beginning of the winding-up operation, one layer of rubber only having been applied.

Fig. 5 is a front elevation of the left-hand half of the upper, or cutting portion of my invention with half of a section of a wheel rim and tire shown positioned as at the close of the winding-up operation, the tire being fully built up from the accumulated layers of rubber on the wheel rim.

Fig. 6 is a side elevation of the upper, or cutting part of my invention with cutters in position against a section of calender roll, with tire supporting roller in position, also showing method of attachment of the pendant frame.

Fig. 7 is an interior side view of the upper, or cutting portion of my invention, also showing rim supporting roller in position and method of attaching pendant frame. A small portion of the cutting knife and nose of the bed piece being cut away.

Fig. 8 shows a portion of a cross section on lines 8—8 of Fig. 3.

Fig. 9 shows the detail of the knife holding mechanism on line 9—9 of Fig. 3.

Figure 1:
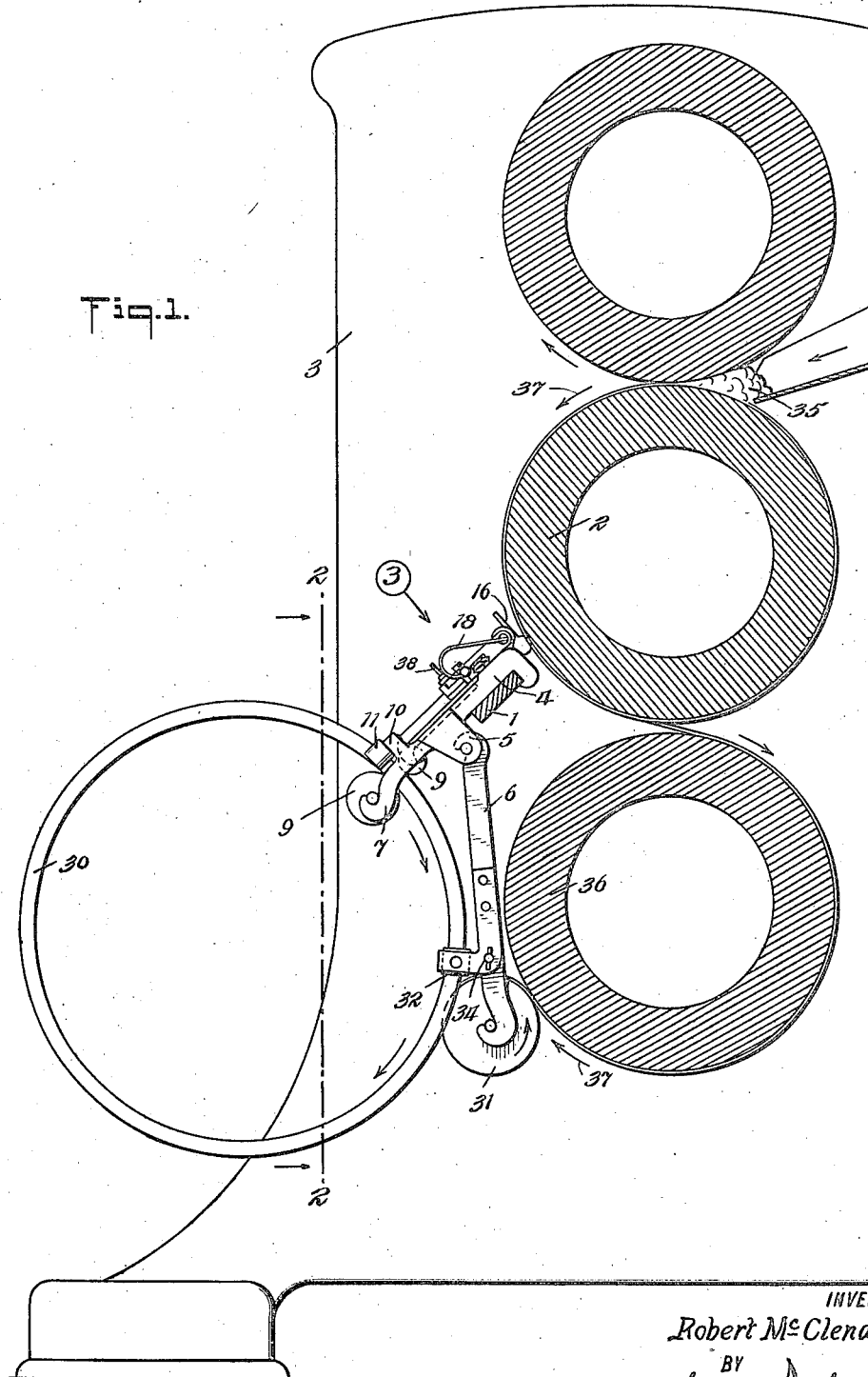

On Figs. 3, 4 and 5 the cutting knives are shown standing at an oblique angle to the calender drum, which would be the position for said knives to cut the edge of the rubber strip on a bevel.

Like numerals refer to like parts in all figures.

The apparatus is held in position by bar 1, which is located in front of, and parallel with, the middle calender drum 2, and slanting downward therefrom, the ends of the bar being securely fastened to the calender standards 3.

The stationary bed frame 4 carries downturned lugs 5, to which the pendant frame 6 is attached. This bed frame has extending arm portions 7, best shown in Fig. 3, which carry shaft 8, on each end of which, is attached integrally a supporting collar 9. This bed frame also has upturned lugs 10 carrying guide rollers 11.

On this bed frame lie carrier plates 12 which are held in sliding contact therewith by a series of double beveled edge rollers, two of which are shown at 13—best view Fig. 6. These sliding plates carry shafts 14 on which are mounted knife holders 15, on which holders are mounted cutting knives, 16, which cutting knives are regulated as to pressure against the calender drum by thumb screw 17 and flat springs 18, and as to distance apart by coiled spring 19 and the movement of triangular cam 20 operating upon the friction rollers 21.

The triangular cam 20 lies on, and in sliding contact with, the stationary bed frame 1 connected therewith by the dovetailed cam shaft 22, which slides in dovetailed slot 23 of bed frame 1 and is frictionally regulated by cap screw 24 and nut 25. A portion of the face of the triangular cam is cut away to accommodate the eccentric cam 26, best shown in Fig. 3, which is operated by hand lever 27, permitting a limited movement of triangular cam 20 independently of the movement of cam shaft 22.

The lower end of cam shaft 22 carries revolving shaft 28, on each end of which is attached integrally a sleeve 29, which contacts with the wound-up rubber on the wheel rim 30 after the rubber has reached the periphery of the flanges, and as the rubber increases in thickness radially on the wheel rim, cam shaft 22 and triangular cam 20 are pushed upward thereby, thus permitting coil spring 19 to shorten the distance between the cutting knives 16 so that the height of the wound-up rubber on the wheel rim automatically regulates the width of each succeeding layer of rubber.

Figure 2:
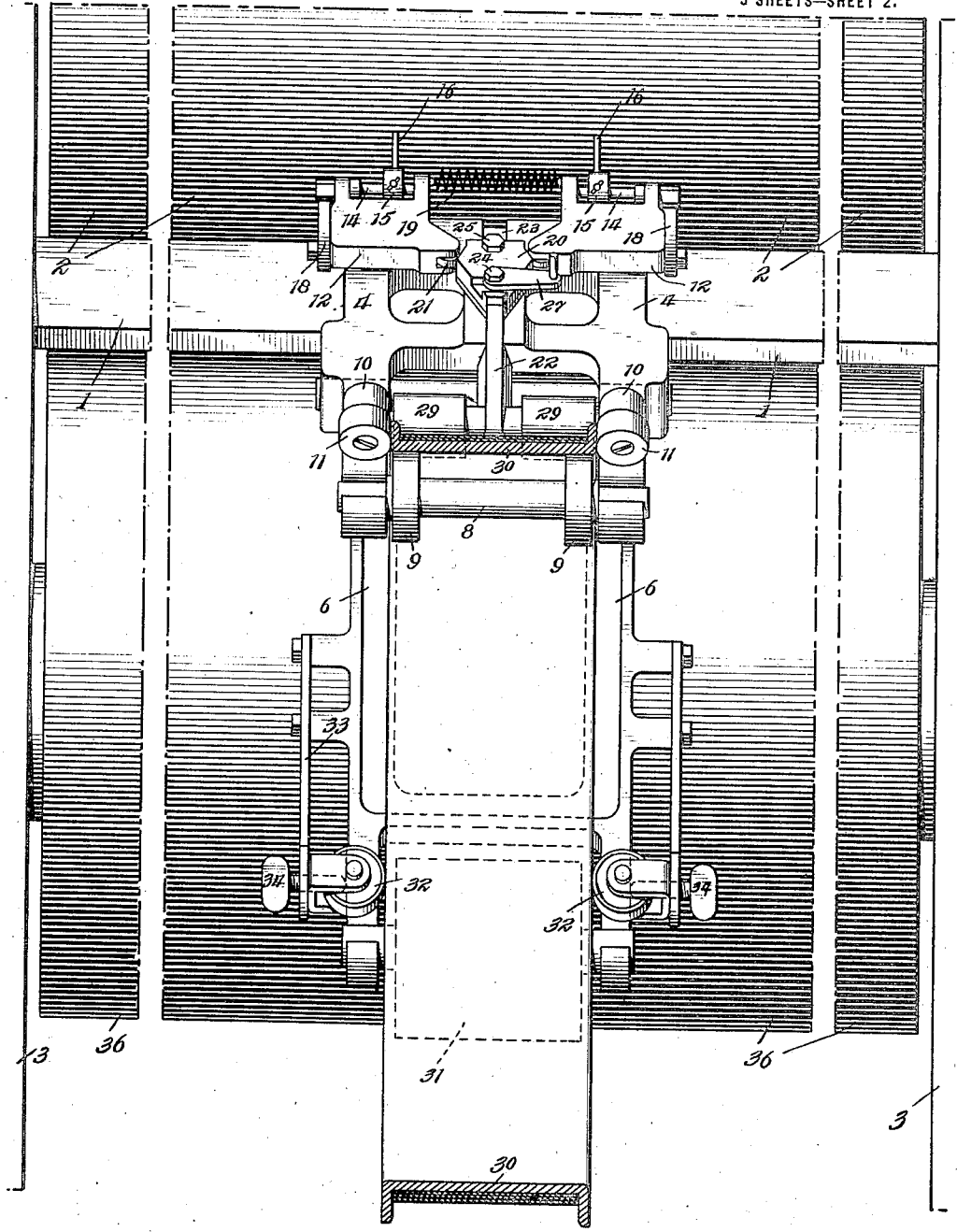
Fig. 2 is a front view of my invention, showing cross sections of the wheel rim in position to receive the rubber strip, two layers of rubber are shown applied to the upper section of the rim and three to the lower section. The machine is suspended in front of the calender on a supporting bar extending between the standards of the calender to which it is firmly attached.

Swinging frame 6 is equipped with driving roller 31, best shown in Fig. 1, and guide rollers 32, best shown in Fig. 2, which guide rollers are regulated as to pressure by springs 33 and thumb screws 34.

In forming these tires it is sometimes desirable when the wound-up rubber has reached the heights of the peripheral edges of the flanges of the wheel rim to suddenly widen the next layer so that it extends over, or partly over the edges of the flanges and then when the flange edges are covered, to at once commence the tapering process which is extended to the periphery of the rubber tire. This sudden change of the width of the cutting knives is accomplished by the hand operation of triangular cam 20 through turning the ecentric cam 26 by hand lever 27 from the position shown in full line in Fig. 2 to the position shown in Fig. 3.

The compounded un-vulcanized rubber is fed into the calender, as shown at 35, and passing between the upper and middle calender drums is regulated as to thickness by the space left between them and if not released from the middle drum, this drum would be entirely coated over with a single sheet of rubber and continue in revolution thus coated indefinitely.

A supply of rubber having been prepared the wheel rim is placed in position over supporting roller 9, which being considerably off center the weight of the metal rim presses firmly against driving roller 31, which in turn presses firmly against the lower calender drum 36, the wheel rim being held in place as it revolves by supporting roller 9 and guide rollers 11 and on the driving roller 31 by guide rollers 32. The collars 29 on the ends of cam shaft 28 are now pulled down against the peripheral edges of the flanges, the eccentric cam lever 27 being turned to the right, as shown in Fig. 2. A strip of rubber of proper width is now started from the middle calender drum, conducted down around the lower calender drum in the direction of the arrow 37 and over driving roller 31 onto the wheel rim.

It will be apparent that the revolution of the lower calender drum 36 operates the driving roller 31, which in turn drives the wheel rim 30, the weight of the rim, being supported off center by supporting roller 9, affording sufficient gravity pressure for the operation and at the same time driving roller 31 presses hard against the wound-up rubber on the wheel rim excluding dirt and air bubbles. As soon as the rubber is built up to the top of the flanges eccentric cam lever 27 is suddenly thrown to the left by the operator to the position shown in Fig. 3. This at once raises triangular cam 20 which increases the distance between cutting knives 16 making the next layer of rubber considerably wider than the succeeding layers and so that it extends partly, or entirely, across the edges of the flanges. Each additional layer of rubber now pushes up triangular cam 20 the thickness of the layer, permitting the coiled spring 19 to pull the knives closer together making each layer of rubber a little narrower than its predecessor until the proper amount of rubber has been placed on the rim. The wheel rim is then easily and quickly released by removing supporting roller 9 and the tire is ready for the mold and vulcanization.

As the sheet of rubber passing between the upper and middle calender drums is much wider than the strip cut out and wound up on the wheel rim, the surplus continues around the middle drum mingling at 35 with the unsheeted compound and finally passing again between the upper and middle calender drums it is presented again to the cutting knives in a perfect sheet.

To prevent triangular cam 20 moving up faster than the rubber builds up on the wheel rim due to the angular pressure of the rollers 21, the face of this triangular cam is covered with leather 20$^a$ making a brake surface which is pressed against bed frame 1 and frictionally regulated by capscrew 24 and nut 25 on stud 38.

It is clear that the cutting knives may be set on an angle so that the edges of the rubber will be cut on a bevel, thus building up the rubber on the tire on an even slant instead of in step like formation as would result if the knives were set at right angles to the face of the calender drum. And in practice I may make a bend, or elbow, in the knife handles so that the cutting edges come in line with their support.

It is apparent that by using cams of different shape tires may be built up with sides of various contours; the principal idea being to have the layers of rubber as they are successively deposited on the wheel rim determine, through the mechanism, the width of the next, and of each succeeding layer, and it is clear that this may be accomplished by apparatus of varying character and the idea involved can be applied to materials other than rubber, and to purposes other than forming rubber tires, and I do not limit myself strictly to the mechanism here shown, or to the use of rubber only.

I claim as my invention—

1. In a machine for forming rubber tires of strips of rubber applied to a rim, strip cutting blades mounted for cutting a strip of rubber contemporaneously as such rubber is applied to the rim, and means to determine the width of the unapplied strips of rubber, such means controlled by the cumulative thickness of the preceding applied strips.

2. In a machine for building up a rubber tire of superimposed strips of sheeted rubber of gradually diminished widths upon a wheel rim, movable strip cutting blades mounted for lateral movement, and means controlled by the cumulative thickness of preceding strips that have been deposited upon the rim for controlling said lateral movement.

3. In a machine for forming rubber tires of super-imposed strips of sheeted rubber applied to a rim, blades mounted for lateral movement for cutting a strip from a rubber sheet, means for pendantly supporting a wheel rim off its center of gravity, a pendant pressure roller suspended between the rim and a supplying calender drum and in gravity contact simultaneously with both the applied and unapplied rubber, and means to rotate said pressure roller.

4. The process of forming solid rubber tires by winding upon a revolving wheel rim super-imposed layers of strips of sheeted rubber cut to a desired width contemporaneously as the layers are wound upon the wheel rim, the width of each layer determined automatically by the cumulative thickness of preceding layers that have been deposited upon the wheel rim.

5. In a machine for forming rubber tires with tapering sides from strips of rubber wound upon a wheel rim, the combination of a fixed support, mounted cutting blades adapted to lateral displacement in coöperation with a movable cam, a movable cam controlling the distance between said cutting blades while in operation, a roller supporting a wheel rim off center, a power transmitting roller in gravity contact simultaneously with both the applied and unapplied rubber, and means to rotate said power transmitting roller and wheel rim.

6. In a machine adapted to form a rubber tire with tapering sides, the combination of means for supporting a wheel rim off center and carrying rubber, mounted cutting blades adapted to cut a strip of rubber of constantly diminishing widths from sheeted rubber, means to deliver said strip to the tire in process of formation on the rim, a friction driven roller interposed between the calender drum and the wheel rim and contacting with the rubber on both drum and wheel rim, a device in engagement with the surface of the rubber on the wheel rim and connected with said cutting blades adapted to draw said blades together in automatic coöperation with the rubber as it is built up upon the wheel rim.

ROBERT McCLENATHEN.